United States Patent [19]

Izor et al.

[11] Patent Number: 5,583,647
[45] Date of Patent: Dec. 10, 1996

[54] CYLINDER SUPPORT APPARATUS AND METHOD FOR USE IN AN ENGRAVER

[75] Inventors: Kim E. Izor, Miamisburg; Kenneth F. Bornhorst, Jr., Centerville; Larry D. Lucous, Dayton, all of Ohio

[73] Assignee: Ohio Electronic Engravers, Inc., Dayton, Ohio

[21] Appl. No.: 292,858

[22] Filed: Aug. 19, 1994

Related U.S. Application Data

[63] Continuation-in-part of Ser. No. 57,327, May 5, 1993, Pat. No. 5,424,846.
[51] Int. Cl.$^6$ ...................................................... B41C 1/02
[52] U.S. Cl. ............................................................ 358/299
[58] Field of Search ............................................. 358/299

[56] References Cited

U.S. PATENT DOCUMENTS

| | | |
|---|---|---|
| 1,815,105 | 7/1931 | Howey . |
| 2,493,628 | 1/1950 | Harley .......................................... 88/14 |
| 2,769,199 | 11/1956 | Boyajean ...................................... 18/1 |
| 2,874,479 | 2/1959 | Farber .......................................... 33/185 |
| 2,881,246 | 4/1959 | Fairchild ...................................... 178/6.6 |
| 3,544,713 | 12/1970 | Case et al. ................................... 178/7.1 |
| 3,582,549 | 6/1971 | Hell et al. .................................... 178/69.5 |
| 3,694,570 | 9/1972 | Kotov et al. ................................. 178/6.6 |
| 3,770,888 | 11/1973 | de Vos et al. ................................ 178/6.6 |
| 3,838,258 | 9/1974 | Logan ........................................... 235/151.11 |
| 3,949,159 | 4/1976 | Richards et al. ............................. 178/6.6 |
| 3,964,382 | 6/1976 | Baar et al. .................................... 101/1 |
| 3,990,113 | 11/1976 | Schalles et al. .............................. 408/33 |
| 4,003,311 | 1/1977 | Bardin .......................................... 101/426 |
| 4,013,829 | 3/1977 | Baar et al. .................................... 358/299 |

(List continued on next page.)

OTHER PUBLICATIONS

"Motion adapted to human needs", Magnetic Antriebstechnik.
"Linear Actuator P Series . . . ", Infomagnetic Antriebstechnik.
"Magpush Linear Actuators. Push–pull solutions that stand out". . . , Magnetic Antriebstechnik.
"Telescope Actuators Telemag GTL . . . ", Infomagnetic Antriebstechnik.
"Telescope Actuators Telemag LC 12 Z . . . ", Infomagnetic Antriebstechnik.
"Telescope Actuators Telemag HC 8 A . . . ", Infomagnetic Antriebstechnik.
"The Telemag Pillar. Gives your ideas the right lift.", Magnetic Antriebstechnik.
"telemag –the obvious choice for flexibility and economy at work". . . , Magnetic Elektromotoren.

(List continued on next page.)

*Primary Examiner*—Peter S. Wong
*Assistant Examiner*—Eric Frahm
*Attorney, Agent, or Firm*—Jacox, Meckstroth & Jenkins

[57] ABSTRACT

A method and apparatus for automated loading and unloading of a cylinder in an engraver. The method and apparatus permit the engraver to accommodate cylinders of differing geometries, including a range of lengths, diameters and mounting configurations. The engraver includes a headstock and a tailstock which cooperate to rotatably support a cylinder at an engraving station in the engraver. The engraver also comprises a cylinder handling system having at least one cylinder support for supporting the cylinder between the headstock and tailstock during loading and unloading of the cylinder. In one form, the cylinder supports each comprise a telescoping support member having a support nest for engaging and supporting the cylinder at the engraving station. In another form, the cylinder supports each include a support housing and a support structure mounted to the support housing. In this form, the support structure includes at least one cylinder receiving area. Selection may be made between plural cylinder receiving areas for receiving cylinders of different dimensions.

53 Claims, 11 Drawing Sheets

U.S. PATENT DOCUMENTS

| | | | |
|---|---|---|---|
| 4,054,081 | 10/1977 | Brown | 90/11 |
| 4,054,745 | 10/1977 | Norman | 178/4.1 |
| 4,057,838 | 11/1977 | Doelves et al. | 358/299 |
| 4,079,235 | 3/1978 | Froyd et al. | 364/107 |
| 4,357,633 | 11/1982 | Buechler | 358/299 |
| 4,450,486 | 5/1984 | Buechler | 358/299 |
| 4,451,856 | 5/1984 | Buechler | 358/299 |
| 4,503,769 | 3/1985 | Anderson | 101/153 |
| 4,603,391 | 7/1986 | Inoue et al. | 364/474 |
| 4,612,584 | 9/1986 | George et al. | 358/299 |
| 4,635,492 | 1/1987 | Uebelhart | 74/89.15 |
| 4,678,976 | 7/1987 | Inoue | 318/577 |
| 5,029,011 | 7/1991 | Fraser | 358/299 |
| 5,113,249 | 5/1992 | Yosefi | 358/299 X |
| 5,178,678 | 1/1993 | Koehler et al. | 101/177 X |
| 5,291,827 | 3/1994 | Liers et al. | 101/424 |

OTHER PUBLICATIONS

"Telemag 2–Section LC12ZWAK", and Telemag 3–Section, LC 12ZWDK.

"Magnetic Linear Actuators. Right for every application"., Magnetic Antriebstechnik.

"Think Boomerang System" Rotogravure Cylinder Making System (Undated).

"Martin Galvanotechnik Galvanoplastie Plating" Martin AG (Undated).

The Gravure Ass'n of Amer., *The Gravure Engraging Manual* (1987).

Balcom, *Basic Rotogravure* (1988).

Heimann GmbH, *Drucktechnische Beratung–Graphischer Handel* (Pamphlet, Hamm, Germany 1984).

Heimann GmbH, *Check–Master* (Pamphlet, Date Unknown).

Ahauser Tiefdruck–Gravuren GmbH & Co., *Engraving Tester ET2000* (Pamphlet, Date Unknown).

Promatec Graphique, *M2B2 modèle déposé Micro Surface Sarl* (Pamphlet, Antony, France, 1987).

*VIP –Video–Image–Processing* (Pamphlet, Author Unknown, Date Unknown).

"Datwyler", Max Daetwyler Corporation, 13420 W. Reese Blvd., Huntersville, NC 28078, undated brochure.

"Twin–Pilot", Maschinenfabrik Kaspar Walter GmbH & Co. KG, Plinganserstrasse 22, 8000 Munchen 70, Germany, undated brochure.

"Getting better accuracy with non–precision ball screws", American Machinist, Feb. 1993.

Kaspar Walter, Correcting station Type 86, Brochure undated.

K. Walter Quick–Clamp Copper and Chrome plating, brochure undated.

CYLINDER SUPPORT APPARATUS AND METHOD FOR USE IN AN ENGRAVER

RELATED APPLICATION

This application is a continuation-in-part of Ser. No. 08/057,327 filed May 5, 1993, now U.S. Pat. No. 5,424,846.

BACKGROUND OF THE INVENTION

1. Field of the Invention

This invention relates to an engraver, and more particularly, it relates to a cylinder support and method for supporting a cylinder to be engraved in an engraver.

2. Description of Related Art

The basic principle of electro-mechanical engraving of a gravure cylinder involves rotating a plated cylinder while actuating an electrically driven tool which cuts or engraves cells or lines into the surface of the plated cylinder. The engraved cylinder is normally used in a web-type gravure printing press for printing paper, plastic or metallic film material. In addition to printing newspapers and magazines, the engraved cylinders may also be used for direct or indirect printing of cloth, applying glue, printing of packaging materials for products, and printing of woodgrain patterns for making wall panelling, floor coverings and other surface coverings.

In the gravure printing process, the engraved cylinder is flooded with ink, and a doctor blade wipes off excess ink from the surface so that only the engraved cells contain ink which is transferred to the material being printed. To obtain a high quality print, it is necessary that the cells be very accurately placed or located on the cylinder surface, usually within 1 or 2 microns of a desired predetermined location. The depth of the engraved cells must also be accurately controlled since the depth determines the amount of ink transferred which, for example, determines the shade of gray in a black/white print. In a color print, the amount of ink transferred to the paper or materials is even more critical since multiple colors are typically mixed to produce various hues. A slight variation in the desired amount of ink affects not only the darkness of the color but, more importantly, the production of the desired color hues.

In engraving systems of the past, a cylinder was manually guided or hoisted to an engraving area of the engraver, whereupon it was secured between a stationary headstock and a slidable tailstock. The tailstock forcibly engaged one end of the cylinder and forced the other end of the cylinder into engagement with the headstock. For a shafted cylinder, the ends of the cylinder would be gripped by chucks or other clamping devices located in the headstock and tailstock.

Another problem with engravers of the past is that the cylinders had to be manually loaded into the engraver. Because of the weight and size of the cylinders, it was very time-consuming to properly position and manually align the cylinders in the engraver. In addition, it was often necessary that the operator manually adjust the tailstock before the engraver could accommodate cylinders of varying lengths. Still another problem is that in the engravers of the past, the operator had to manually adjust the engraving head to accommodate cylinders of different diameters.

This alignment problem is particularly acute where shafted cylinders are supported by chucks for engraving. Collet chucks used to support such shafted cylinders may have a clearance of as little as 0.005 inch (approximately 0.0127 cm). It is very difficult to manually align shafts within such a tight clearance, even without the added difficulty of the weight and size of the cylinder.

What is needed, therefore, is a method and apparatus for facilitating loading a cylinder in an engraver and for handling the cylinder so that it can be easily centered and aligned between the headstock and tailstock of the engraver.

SUMMARY OF THE INVENTION

In one aspect, this invention comprises a cylinder handling system for use in an engraver having a headstock and a tailstock which cooperate to rotatably support a cylinder at an engraving station in the engraver, comprising at least one support for supporting the cylinder between said headstock and tailstock; and a driver coupled to the at least one support for driving that at least one support towards and away from the engraving station.

In another aspect, the invention comprises a cylinder support for use in an engraver having a headstock and tailstock which cooperate to rotatably support a cylinder at an engraving station in the engraver, comprising support means for supporting the cylinder between the headstock and tailstock; and drive means coupled to the support means for driving the support means towards and away from the engraving station.

In another aspect, the invention comprises the method for supporting a cylinder in an engraver comprising the steps of: (a) positioning the cylinder on a support at an engraving station in the engraver; (b) rotatably supporting the cylinder between a headstock and a tailstock; and (c) retracting said support away from said engraving station.

In another aspect, the invention comprises the method for supporting a cylinder in an engraver comprising the steps of: (a) positioning the cylinder on a support at an engraving station in the engraver; (b) rotatably supporting the cylinder between a headstock and a tailstock; (c) retracting the support away from the engraving station; and (d) driving the engraver which permits the head to be driven into operative relationship with the cylinder surface.

In another aspect, the invention comprises a cylinder handling system for use in an engraver including a headstock and a tailstock which cooperate to position and support a cylinder at an engraving station. The cylinder handling system includes two cylinder supports. Each of the cylinder supports comprises a support housing and support structure mounted to the support housing. The support structures each include at least one cylinder receiving area for receiving and positioning a cylinder. Selection may be made between plural cylinder receiving areas for receiving cylinders of different dimensions.

An object of this invention is to provide a method and apparatus for loading a cylinder in an engraver, which either reduces or eliminates the need for precision handling by an operator.

Another object of this invention is to provide a cylinder handling system which facilitates the centering of a cylinder between a headstock and a tailstock of an engraver.

Still another object is to provide an engraver which can accept a variety of setup parameters, including cylinder length, diameter, test cut position and engrave head characteristics from a controller and use the parameters to automatically control the handling and engraving of cylinders of different sizes.

Another object of this invention is to provide a system for supporting and accurately positioning a plurality of cylinders having different dimensions.

These objects, and others, may be more readily understood in connection with the following specification, claims, and drawing.

DETAILED DESCRIPTION OF THE PREFERRED EMBODIMENT

1. Embodiment of FIGS. 1–6

Figure 1:
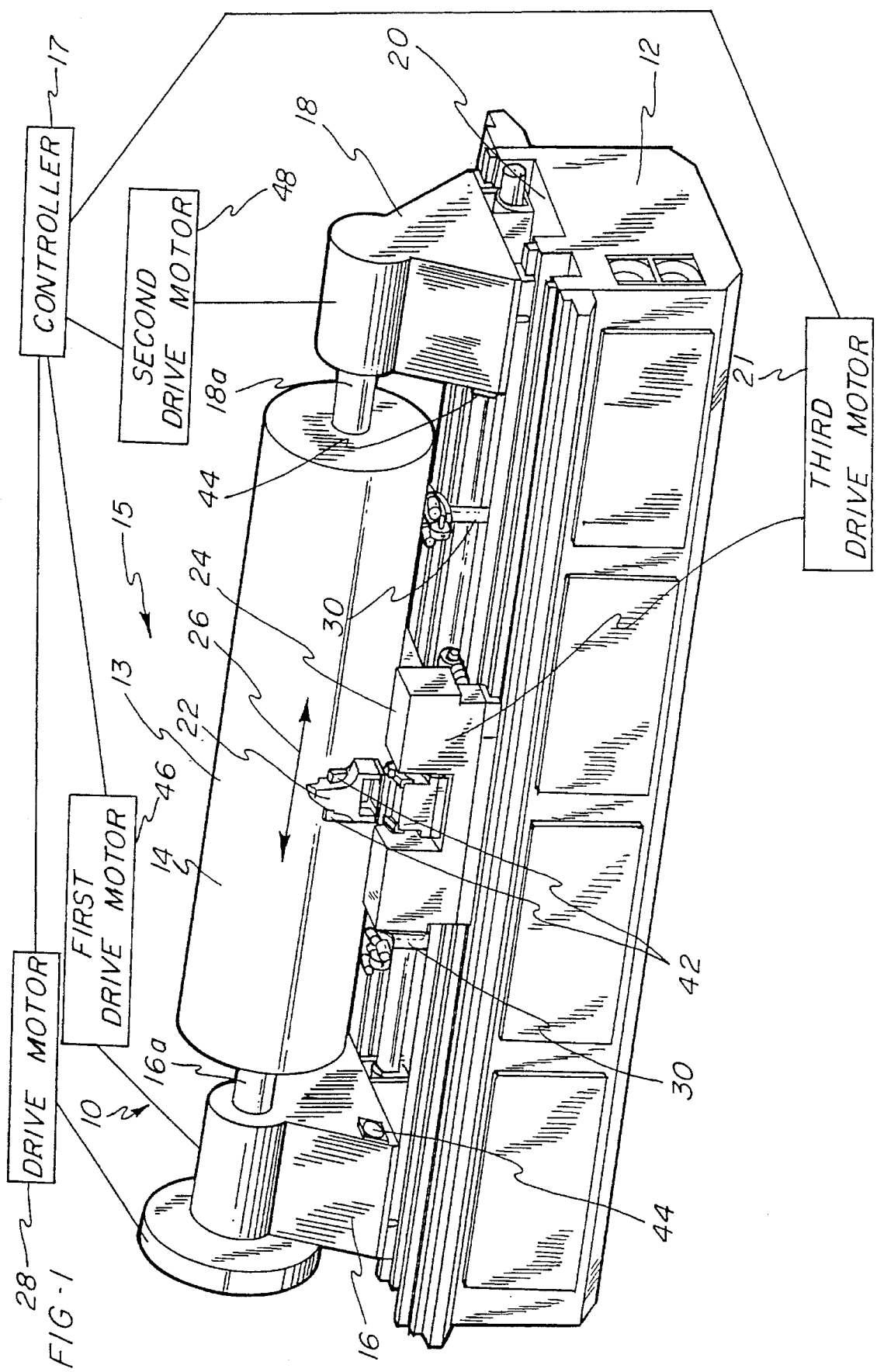
FIG. 1 is perspective view of a programmable gravure engraver showing a headstock, a tailstock, an engraving head, and a plurality of cylinder supports.

FIG. 1 is a general perspective view of a preferred embodiment of an engraver, designated generally as engraver 10. In the embodiment being described, the engraver 10 is a gravure engraver, but the invention may be suitable for use in any engraver. The engraver 10 may have a surrounding slidable safety cabinet structure which is not shown for ease of illustration. Engraver 10 comprises a base 12 having a headstock 16 and tailstock 18 slidably mounted in tracks 20 such that the headstock 16 and tailstock 18 can move towards and away from each other. In this regard, engraver 10 comprises a plurality of linear actuators or first drive motor means or first drive motor 46 and a second drive motor means or second drive motor 48 which are capable of driving the headstock 16 and tailstock 18, respectively, towards and away from each other.

Figure 2:
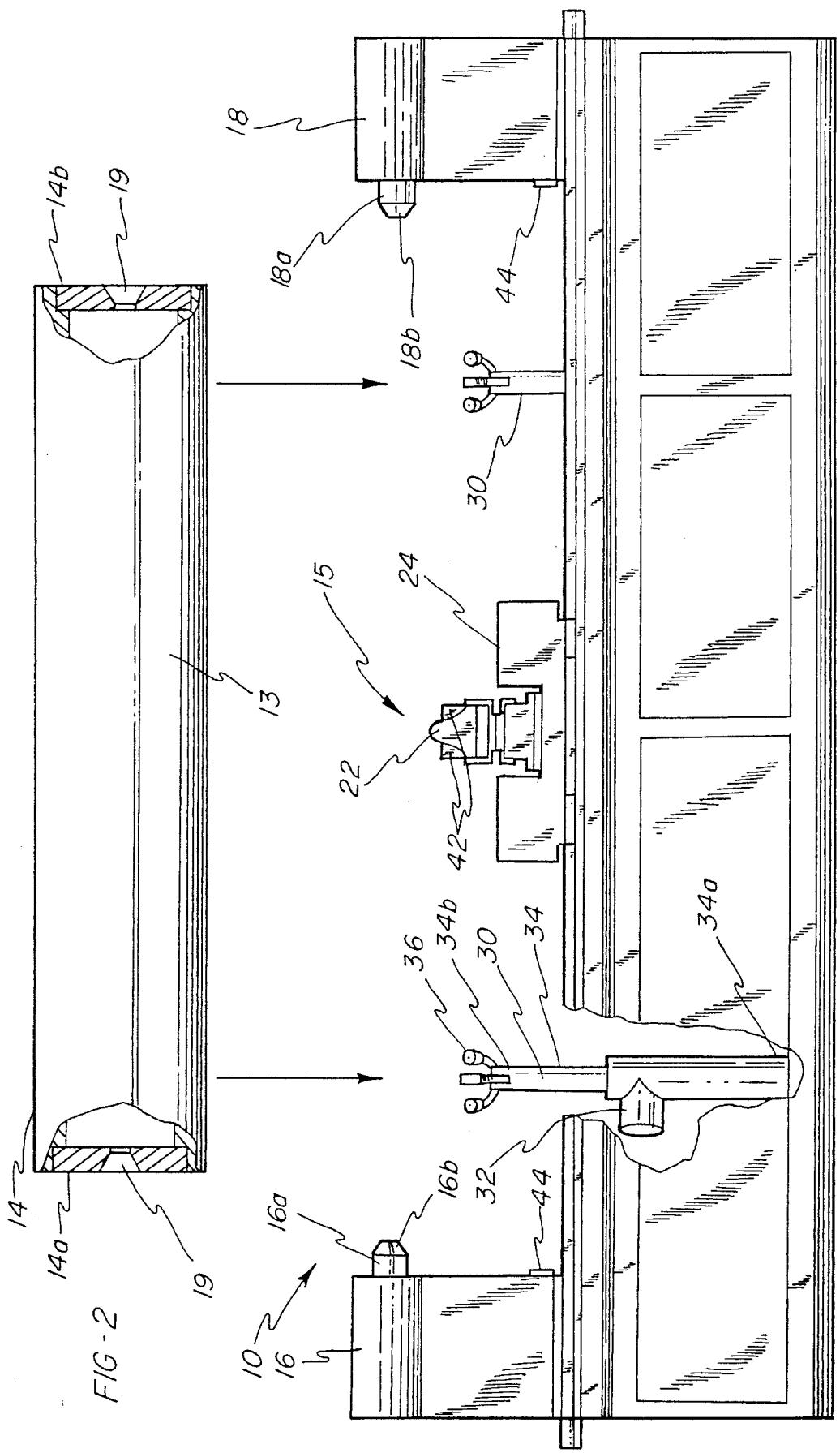
FIG. 2 is a fragmentary front plan view of the engraver shown in FIG. 1, showing details of one of the telescoping cylinder supports.

For example, the drive motors may cause the headstock 16 and tailstock 18 to be actuated to a fully retracted position, as shown in FIG. 2, or to a cylinder support position shown in FIG. 1. The drive motors may be selectively energized to cause the headstock 16 and tailstock 18 to be actuated either independently or simultaneously. Although not shown, a single drive motor may be used with a single lead screw (not shown) having reverse threads (not shown) on which either end causes the headstock 16 and tailstock 18 to move simultaneously towards and away from each other as the leadscrew is driven. Driving both the headstock 16 and tailstock 18 permits cylinders 14 of varying lengths to be loaded by an overhead crane, for example, whose path is perpendicular to the axis of rotation of the engraver. However, it should be appreciated that a stationary headstock 16 and tailstock 18 may be used with a driven tailstock 16 or headstock 18, respectively, if, for example, a cylinder loading mechanism (not shown) loads the cylinder 14 by moving it in a direction which is generally parallel to the axis of rotation of the engraver.

Figure 3:
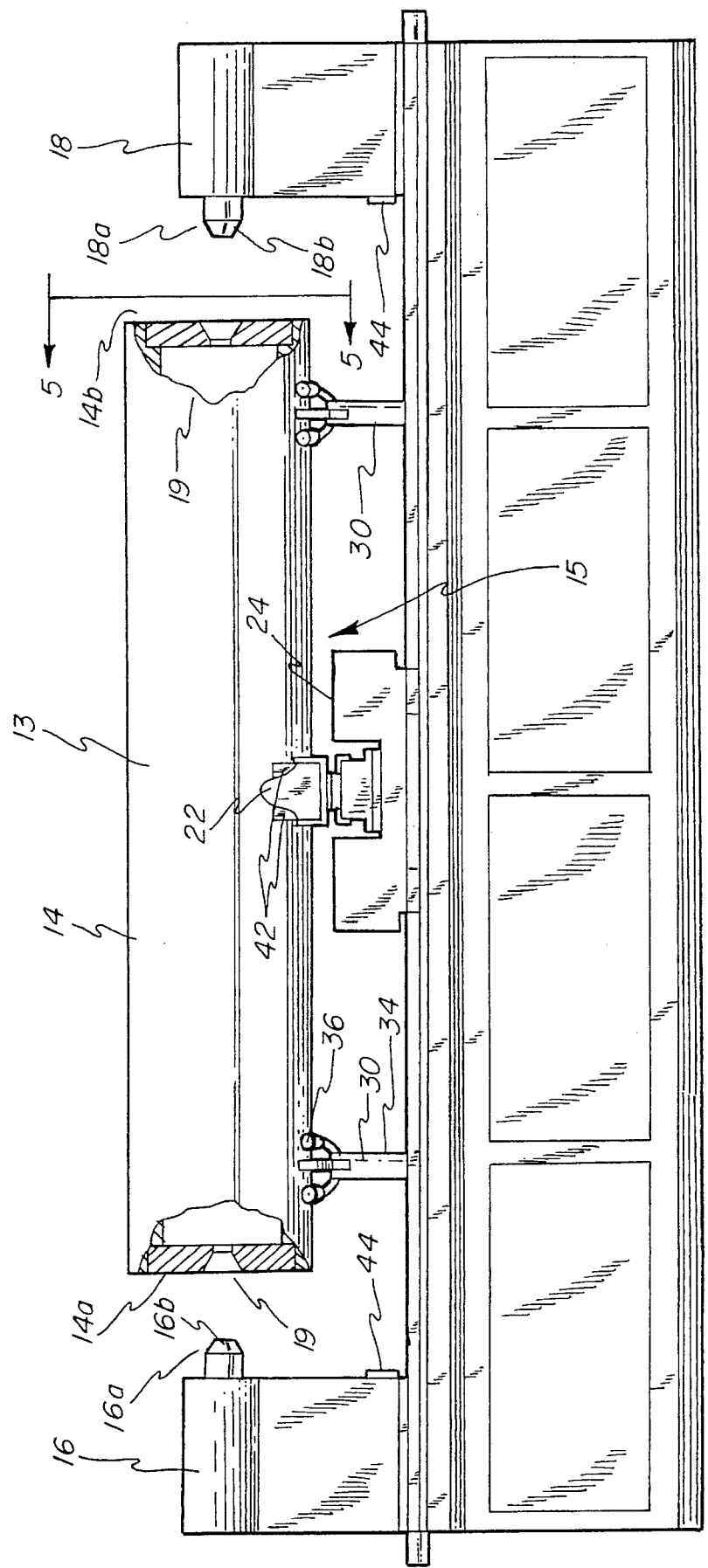
FIG. 3 is another plan view of the engraver showing the cylinder supported by the cylinder supports.
Figure 4:
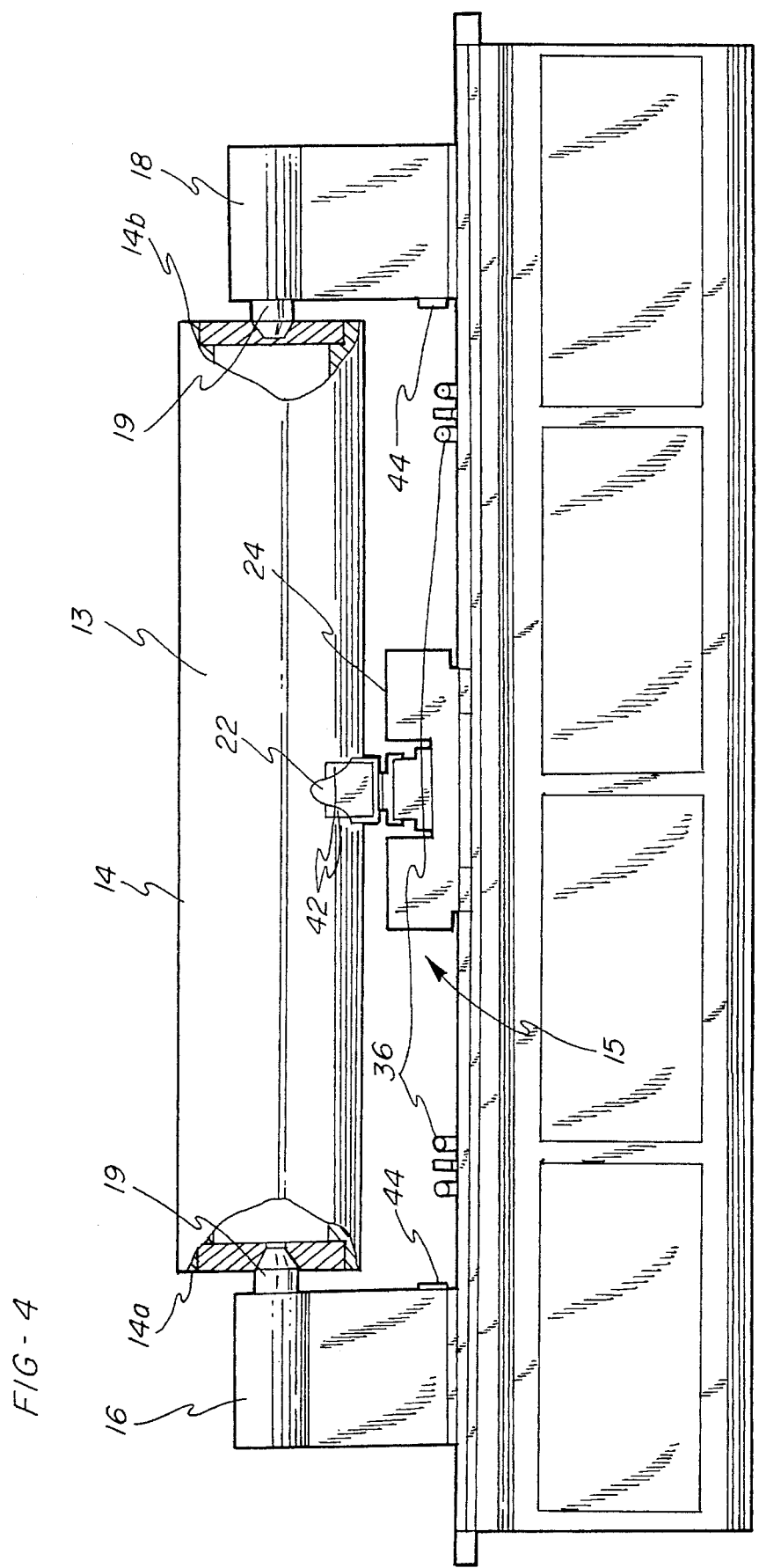
FIG. 4 is another plan view of the engraver showing the cylinder rotatably supported by the headstock and tailstock after the cylinder supports have been retracted.

As best illustrated in FIGS. 2–4, the headstock 16 and tailstock 18 comprise a support shaft 16a and support shaft 18a, respectively. The support shafts 16a and 18a each comprise a conically shaped end 16b and 18b, respectively. The cylinder 14 comprises a first end 14a and second end 14b each having a receiving opening 19 (FIG. 2) for receiving ends 16b and 18b, respectively. As best illustrated in FIGS. 2–4, the receiving opening 19 is also conically shaped in cross-section so as to matingly receive the ends 16b and 18b.

Figure 7:
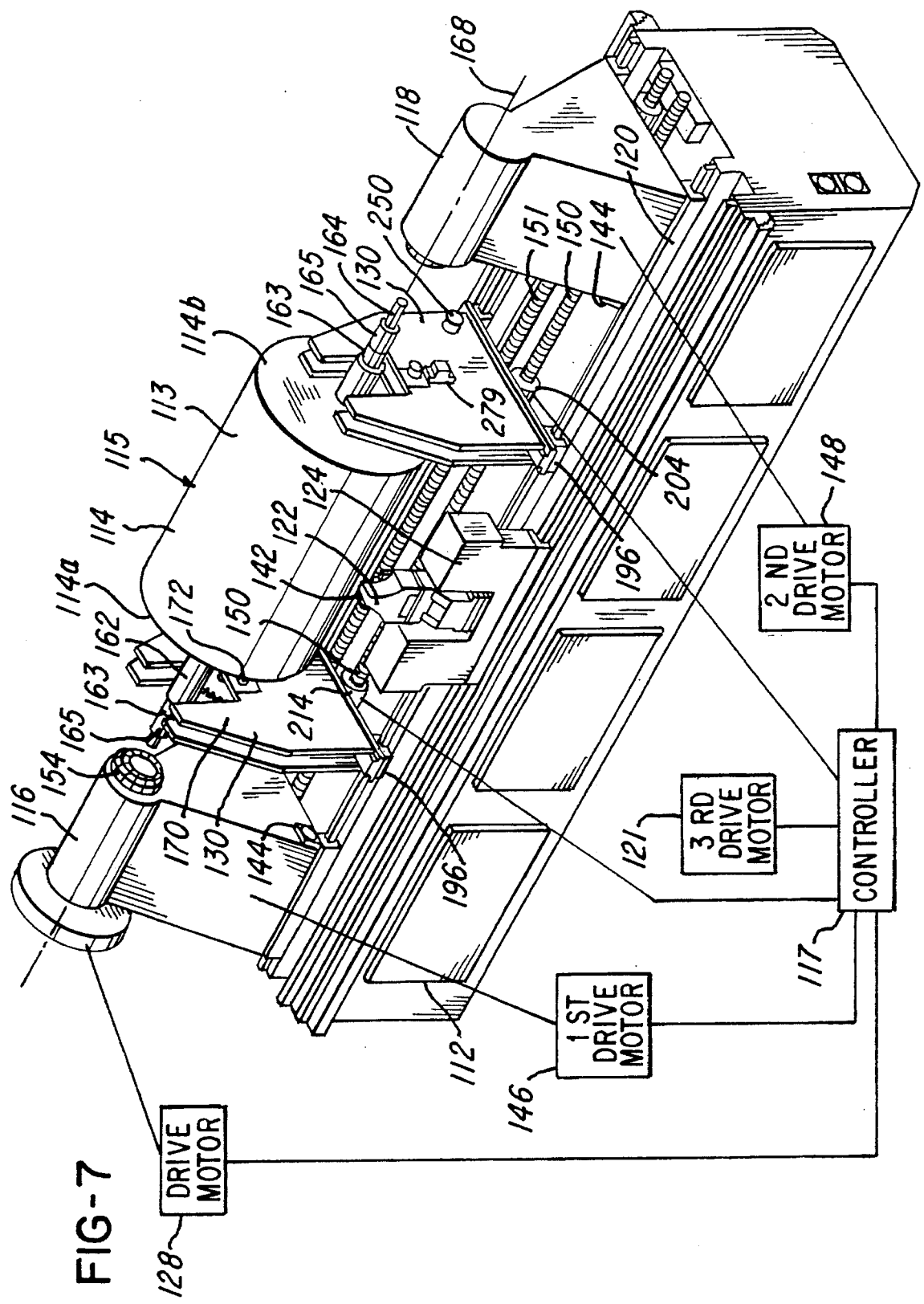
FIG. 7 is a perspective view of a programmable gravure engraver showing a headstock, a tailstock, an engraving head, and opposed axially-movable cylinder support members, with a shafted cylinder supported on the cylinder support members.

If a shafted cylinder (shown as 114 in the embodiment of FIG. 7) were to be engraved, then the headstock 116 (see FIG. 7) and tailstock 118 (FIG. 7) would each include a gripping device or chuck 154, 156 (FIG. 7) to rotatably support the cylinder 114 (FIG. 7) at the engraving station 115 (FIG. 7).

The engraver 10 also comprises an engraving head 22 having a cutting tool or stylus (not shown) for engraving a surface 13 on the cylinder 14. In the embodiment being described, surface 13 preferably has a copper coating of the type used in gravure engraving. The engraving head 22 is slidably mounted on a carriage 24 such that a third drive means or third drive motor 21 can drive the engraving head 22 towards and away from the cylinder 14 in a direction which is generally radial with respect to the center axis of cylinder 14. The carriage 24 is also slidably mounted on base 12 such that it traverses the entire surface 13 of cylinder 14 in the direction of double arrow 26 in FIG. 1, which is generally parallel to the axis of the cylinder 14. The engraver 10 also comprises a lead screw (not shown) and drive motors (not shown) for causing the carriage 24 to move in the direction of double arrow 26. The engraving head 22, carriage 24 and transverse movement thereof is similar to that shown in U.S. Pat. No. 5,329,215, issued on Jul. 12, 1994; patent application Ser. No. 08/038,679 and patent application Ser. No. 08/022,127, which are assigned to the same assignee as the present invention and each of which is incorporated herein by reference.

The engraver comprises a controller 17 which controls the operation of the engraver 10 and which also controls all the drive motors, such as drive motors 21, 46 and 48. The drive motors 21, 46 and 48 mentioned herein are controlled by a programmable controller 17 which controls the operation of the engraver 10.

The engraver 10 also comprises drive means or a drive motor 28 for rotatably driving the support member 16a, cylinder 14, and support member 18a. The drive motor 28 is operatively coupled to the programmable controller 17.

The engraver 10 further comprises support means or at least one cylinder support 30 for supporting the cylinder 14 between the headstock 16 and tailstock 18, for example, during loading and unloading. The cylinder support 30 comprises a support member 34 having a first end 34a conventionally secured to base 12, for example, by a weld. A second end 34b of support member 34 comprises a support nest 36 which receives and supports cylinder 14. In the embodiment being described, the support member 30 is a telescoping support, with the second end 34b being capable of telescoping towards and away from said first end 34a. In this regard, each cylinder support 30 also comprises drive means or a driver 32 which is coupled to controller 17 and which comprises a gear and screw assembly (not shown) for telescoping or driving the support nest 36 towards and away from the engraving station 15. As best illustrated in FIG. 2, the controller 17 can energize driver 32 to move the cylinder support 30 into the support position shown in FIG. 2, whereupon the support nest 36 is capable of supporting the cylinder 14 at engraving station 15, for example, when the cylinder 14 is being loaded for engraving. As described later herein, the controller 17 subsequently energizes driver 32 to retract the cylinder support 30 and support nest 36 to the retracted position shown in FIG. 4, for example, after the support shafts 16a and 18a of headstock 16 and tailstock 18, respectively, have engaged and support the cylinder 14.

Figure 5:
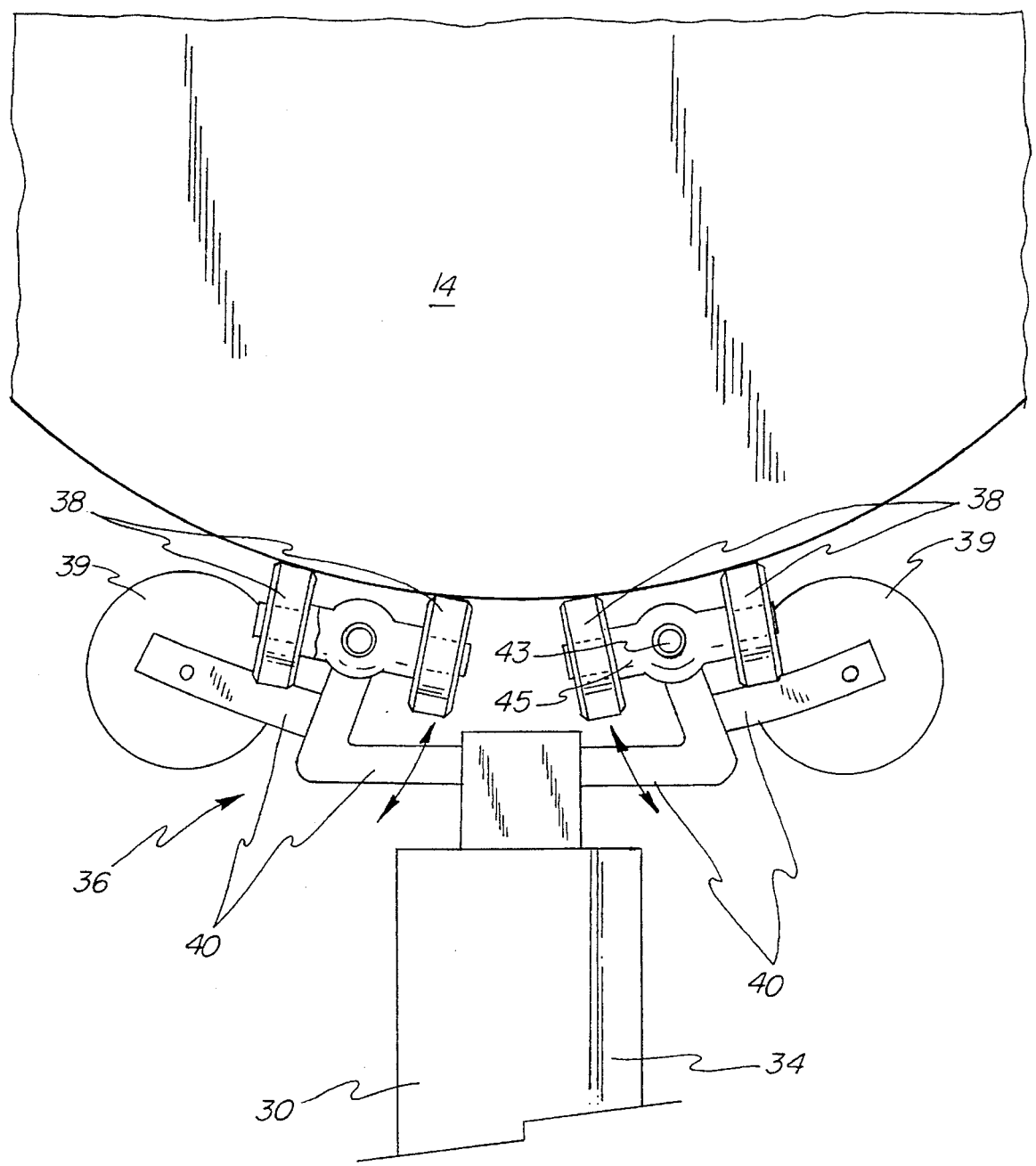
FIG. 5 is a fragmentary sectional view showing details of the cylinder support and a support nest.
Figure 6:
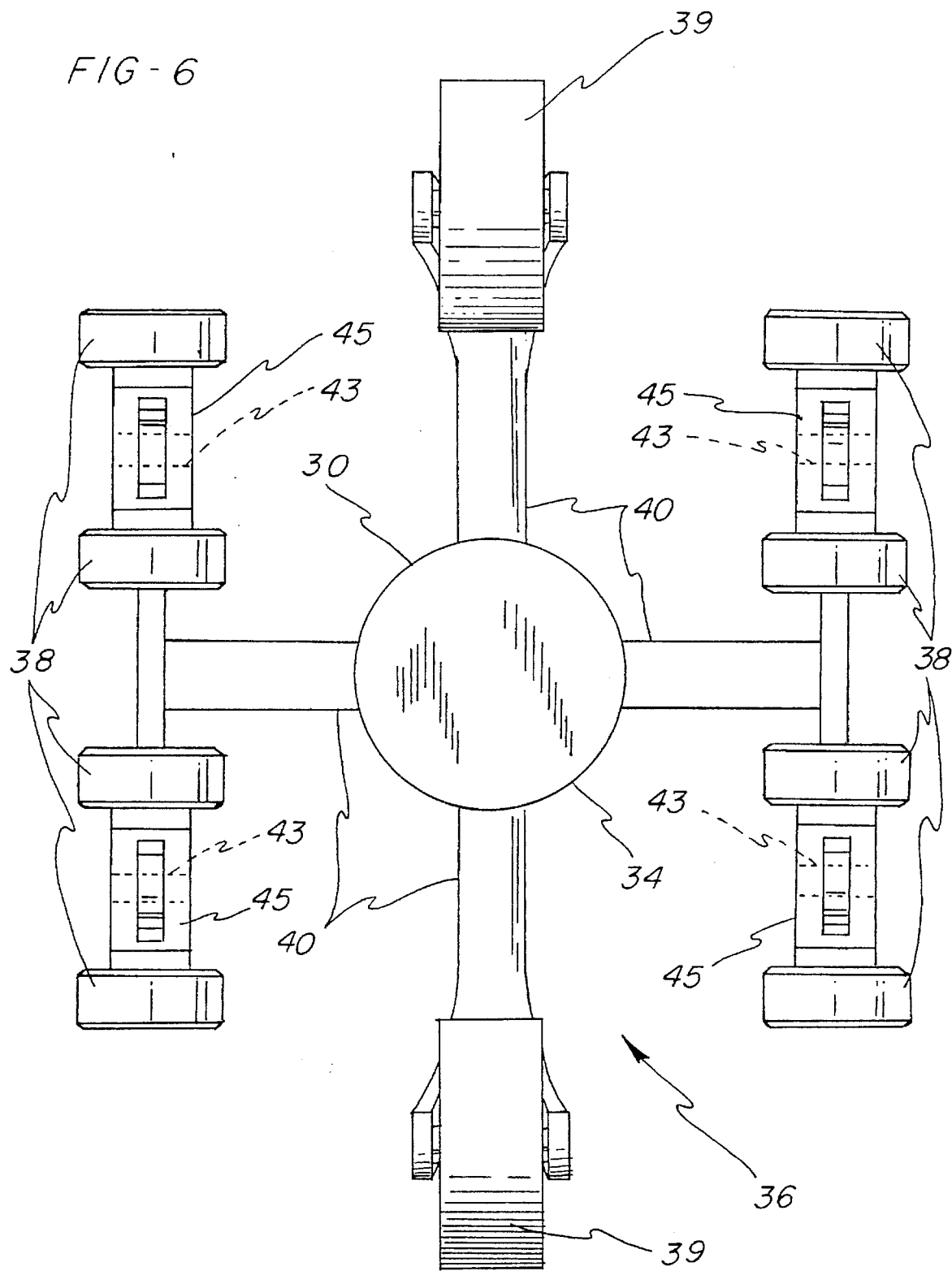
FIG. 6 is a top view of one of the cylinder supports, showing details of the support nest.

As best shown in FIGS. 5 and 6, the support nest 36 comprises a plurality of support arms 40 which rotatably support a plurality of rollers 38 and 39. The plurality of rollers 38 are mounted in pairs on a roller assembly 45. Each roller assembly 45 is pivotally mounted on an axle 43 (FIG. 5) which is coupled to one of the support arms 40. As best illustrated in FIG. 5, each roller assembly 45 can pivot about the axis of its respective axle 43. The roller assemblies 45 are each self-aligning and pivot to permit the engraver to accommodate a range of cylinder diameters.

The axis of each roller 38 is generally perpendicular to the axis of cylinder 14. This facilitates permitting the cylinder 14 to move laterally in the engraver 10 when the headstock 16 and tailstock 18 grip and release the cylinder 14. The plurality of rollers 38 also facilitate supporting cylinder 14 such that its center axis is generally parallel with the center axis of each of the support shafts 16a and 18a of the headstock 16 and tailstock 18, respectively.

It is to be noted that rollers 39 facilitate guiding and centering cylinder 14 between the headstock 16 and tailstock 18, thereby accommodating lateral misalignment when the cylinder 14 is loaded onto the engraver 10 from above. In the embodiment being described, the plurality of rollers 38 and 39 are made of composite material. It is to be noted that the support nest 36 is capable of supporting cylinders 14 of various weights and having various lengths and diameters.

Although not shown, the engraver 10 may include a plurality of brushes (not shown) positioned in operative relationship with the rollers 38 and 39. The function of the brushes is to clean the rollers and keep their surfaces free of foreign material, such as copper shavings. This facilitates preventing the engraver 10 from making unwanted indentations or scratches in the surface 13 of cylinder 14.

The engraver 10 also comprises sensing means or first sensors 42 which are coupled to controller 17 and which are located on the engraving head 22 (FIG. 1). The sensing means or sensors 42 are capable of sensing, for example, the surface 13 of cylinder 14. The sensors 42 are also capable of sensing the ends 14a and 14b of cylinder 14.

The engraver 10 also comprises second sensing means or sensors 44 coupled to controller 17 and associated with the headstock 16 and tailstock 18 for detecting the approximate location of the carriage 24 relative to the headstock 16 and tailstock 18. In the embodiment being described the first and second sensors 42 and 44 facilitate preventing the carriage 24 from engaging either the headstock 16 or the tailstock 18. A method for loading and unloading the cylinder 14 on the engraver 10 will now be described.

When it is desired to load a cylinder 14 on engraver 10, controller 17 energizes the first and second driver motors 46 and 48 to cause the headstock 16 and tailstock 18, respectively, to move to the loading position shown in FIG. 2. It is to be noted that controller 17 can be programmed with dimensions of the cylinder 14, such as length and diameter. The controller 17 also energizes driver 32 of cylinder support 30 to telescope the support member 34 such that the support nest 36 is operatively positioned at the engraving station 15, as shown in FIG. 2. It is to be noted that controller 17, having been programmed with the length and diameter of cylinder 14, energizes driver 32 to position the support nest 36 such that, when cylinder 14 is supported by the cylinder supports 30, the ends 16b and 18b are generally positioned in operative relationship or alignment with receiving openings 19 on the first end 14a and second end 14b, respectively. After the headstock 16 and tailstock 18 have been actuated to the open position shown in FIG. 2 and the cylinder supports 30 are in the support position, the cylinder 14 is lowered onto the support nest 36. As mentioned earlier herein, the plurality of rollers 39 assist locating and centering the cylinder 14 on the roller assemblies 45 and their respective rollers 38.

Once the cylinder 14 is supported by the support nests 36 of cylinder supports 30, the controller 17 can energize the first and second drivers 46 and 48 to drive the support members 16a and 18a towards ends 14a and 14b, respectively. The headstock 16 and tailstock 18 are driven towards cylinder ends 14a and 14b, respectively, until ends 16b and 18b matingly engage the mating receiving openings 19 in the ends 14a and 14b. Once cylinder 14 is supported between ends 16b and 18b of headstock 16 and tailstock 18, respectively, controller 17 energizes the driver 32 to retract the support nest 36 to the non-support position shown in FIG. 4. It is to be noted that the cylinder 14 is rotatably supported between the headstock 16 and tailstock 18 such that, when controller 17 energizes drive motor 28, the cylinder 14 rotates, for example, in a clockwise direction.

The controller 17 subsequently energizes the third drive motor 21 to move the carriage 24 and engraving head 22, respectively, into operative relationship with the surface 13 of the cylinder 14. It is to be noted that the controller 17 may use sensors 42 and 44 to detect the relative position of the cylinder 14 with respect to the engraving head 22. The sensors 42 and 44 are also capable of sensing the ends 14a and 14b in order to facilitate preventing carriage 24 from engaging either the headstock 16 or tailstock 18. The sensors 42 and 44 also permit the controller 17 to position the engraving head 22 in the approximate center of cylinder 14 which, in turn, enables the engraver 10 to accommodate for longitudinal variations in cylinder 14 lengths after the cylinder 14 has been rotatably mounted in the engraver 10. This permits the image (not shown) to be engraved in the surface 13 to be centered on the cylinder 14. The sensors 42 and 44 also enable the engraver 10 to set travel limits to prevent the engraving head 22 from engaging either the headstock 16 or tailstock 18.

After the cylinder 14 is properly located at the engraving station 15, the cylinder ends 14a and 14b are detected by sensors 42 and 44. A test pattern (not shown) is engraved at a position typically defined by the controller 17 or a supervisory computer (not shown). The test pattern is a small pattern of full and partial cells (not shown) characteristic of the cells to be engraved on the cylinder surface 13. The test pattern is typically cut at a location on the surface 13 which will not be used by the image being engraved.

If the test pattern cut is unsatisfactory, then correction are made and another test pattern is cut. This process is repeated until a successful test pattern is cut. If the test pattern is acceptable, in the embodiment being described, controller 17 energizes drive motor 28 to rotatably drive cylinder 14. Controller 17 then causes the carriage 24 to cause the engraving head 22 to traverse the surface 13 of cylinder 14 and simultaneously energizes the cutting stylus (not shown) to oscillate into contact with the cylinder 14, thereby engraving the desired image which comprises a series of control depth cells (not shown) in the surface 13 of cylinder 14. The cylinder 14 rotates in synchronism with the oscillating movement of the stylus (not shown) while the lead screw (not shown) arrangement provides axial movement of the engraving head 22 and carriage 24 such that a precisely controlled engraving path (not shown) is maintained on the surface 13 of print cylinder 14.

After engraving has been completed, controller 17 energizes third drive motor 21 to retract the engraving head 22. Controller 17 also energizes driver 32 to cause the cylinder support 30 to move into the support position shown in FIGS. 1 and 2. Controller 17 then energizes the first and second drive motors 46 and 48 to retract the headstock 16 and tailstock 18, respectively, as shown in FIG. 3. The cylinder 14 may then be removed from the engraving station 15, and another cylinder may then be loaded and engraved in the manner described above.

Advantageously, this invention provides a method and apparatus for automatically loading an engraver 10 with a cylinder 14 to be engraved. The method and apparatus reduce or eliminate the need for an operator during loading and unloading of cylinder 14. The invention may be used to fully automate the engraving process or, alternatively, the invention could be semi-automated, thereby permitting the operator to manually control the operation of the engraver 10. The method and apparatus also provide means for automatically loading and centering cylinder 14 at engraving station 15 such that, for example, when the engraving head 22 is in the home position shown in FIG. 1, the engraving head 22 is positioned generally midway between ends 14a and 14b of cylinder 14.

2. Embodiment of FIGS. 7–11

Referring to FIGS. 7–11, another embodiment of the present invention is illustrated wherein elements similar to those described with reference to the previous embodiment are labeled with the same reference numeral increased by 100. The engraver 110 shown in FIG. 7 is similar to that shown in FIG. 1. One difference between the embodiments of FIGS. 1 and 7 is that the cylinder supports 30 of the embodiment of FIG. 1 have been replaced with cylinder support members or cylinder supports 130 movable along the length of base 112 on at least one leadscrew 150. Another difference is that, for purposes of the embodiment of FIG. 7, the support shafts 16a, 18a have been replaced by cylinder engaging or gripping means in the form of chucks 154 for receiving a shafted cylinder 114. The cylinder supports 130 are adapted to position cylinders such as the shafted cylinder 114 with precision relative to the chucks 154 on the headstock 116 and tailstock 118.

As with the engraver 10 of FIG. 1, the engraver 110 comprises a base 112 having a headstock 116 and tailstock 118 slidably mounted on track 120 such that the headstock 116 and tailstock 118 can move towards and away from each other. The engraver 110 further comprises a plurality of linear actuators or first drive motor means or first drive motor (shown schematically at 146) and a second drive motor means or second drive motor (shown schematically at 148) which are capable of driving the headstock 116 and tailstock 118, respectively, towards and away from each other along a leadscrew 151 which is preferably non-rotatably supported on the base 112. It should be appreciated, however, that the engraver 110 could be provided with one or more rotatable screws operatively coupled to fixed nuts (not shown) associated with the headstock 116 and tailstock 118. The drive motors 146, 148 may cause the headstock 116 and tailstock 118 to be actuated to a fully retracted position, as shown in FIG. 7, or to a cylinder support position shown in FIG. 8.

Figure 8:
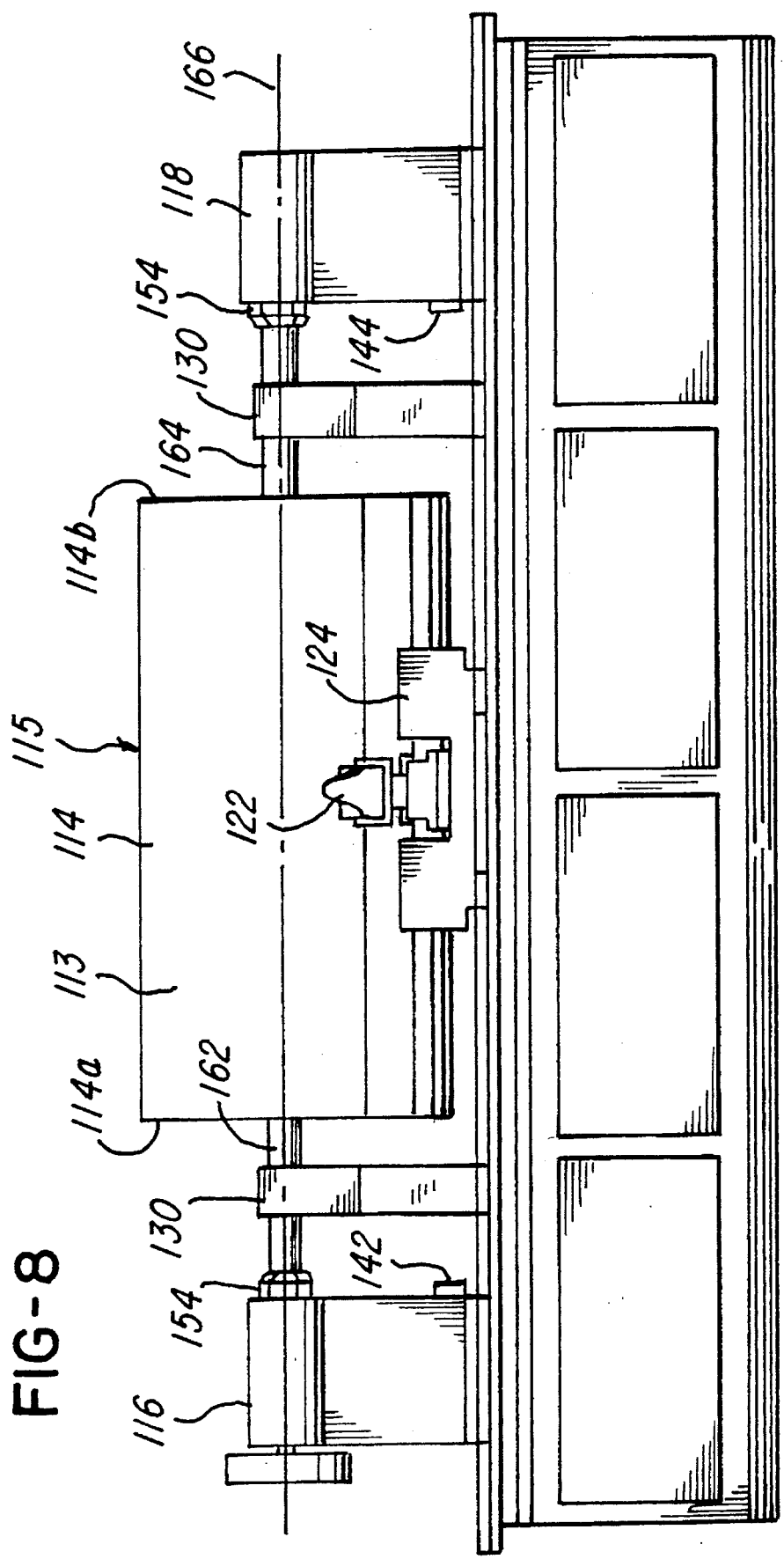
FIG. 8 is a front plan view of the programmable engraver of FIG. 7, with the shafted cylinder supported by the headstock and tailstock.

As best illustrated in FIGS. 7 and 8, the headstock 116 and tailstock 118 each comprise one of the chucks 154. Preferred chucks 154 include actuators (not shown) for closing collets (not shown) within the chucks 154 to engage opposite end shafts 162 and 164 of the cylinder 114 to rotatably support the cylinder 114 at the engraving station 115. It should be appreciated that the chucks 154 could be any chuck which is capable of supporting the end shafts 162 and 164, such as scroll chucks, multijaw chucks, or other flexible jaw action chucks. One source of such chucks is the Buck Chuck Company of Kalamazoo, Mich. The clearance of such chucks 154 for receiving the end shafts 162, 164 may be as small as 0.005 inch (0.0125 cm). The chucks 154 align the cylinder 114 such that the cylinder is within a few thousandths of its engraving position. In this regard it should be noted that the end shafts 162 and 164 are conventionally formed with stepped portions wherein an intermediate stepped portion 163 includes a bearing journal 165. The bearing journal 165 is formed such that its surface is located at a precise predetermined radial distance from the engraving surface of the cylinder 114. In accordance with the present invention, the chucks 154 engage the bearing journals 165 to thereby obtain precise registration of the cylinder surface within the engraver 110 in a manner that is generally quicker and more accurate than prior systems. It should be appreciated that the chucks 154 engage the bearing journal 165 such that the cylinder 114 becomes registered on the engraver 110 with a predetermined tolerance, such as within a few thousandths of an inch relative to a predetermined engraving position. The engraver 110 also comprises drive means or a drive motor 128 for rotatably driving the chucks 154 and the cylinder 114.

The engraver 110 also comprises an engraving head 122 having a cutting tool or stylus (not shown) for engraving a surface 113 on the cylinder 114. The engraving head 122 is slidably mounted on a carriage 124 such that a third drive means or third drive motor (shown schematically at 121) can drive the engraving head 122 towards and away from the cylinder 114 in a direction which is generally radial with respect to an axis 168 of the cylinder 114. The carriage 124 is also slidably mounted on the base 112 such that it traverses the entire surface 113 of cylinder 114 generally parallel to the axis 168 of the cylinder 114. The engraver 110 also comprises a lead screw (not shown) and drive motors (not shown) similar to those of the embodiment of FIG. 1 for moving the carriage 124.

As noted above, the engraver 110 further comprises the support means or at least one cylinder support 130 for supporting the cylinder 114 between the headstock 116 and tailstock 118, for example, during loading and unloading. Preferably, a cylinder support 130 is associated with each of the headstock 116 and tailstock 118, and each cylinder support 130 is supported on the engraver base 112 for movement in a direction parallel to the axis of the cylinder 114, as will be described further below.

Figure 9:
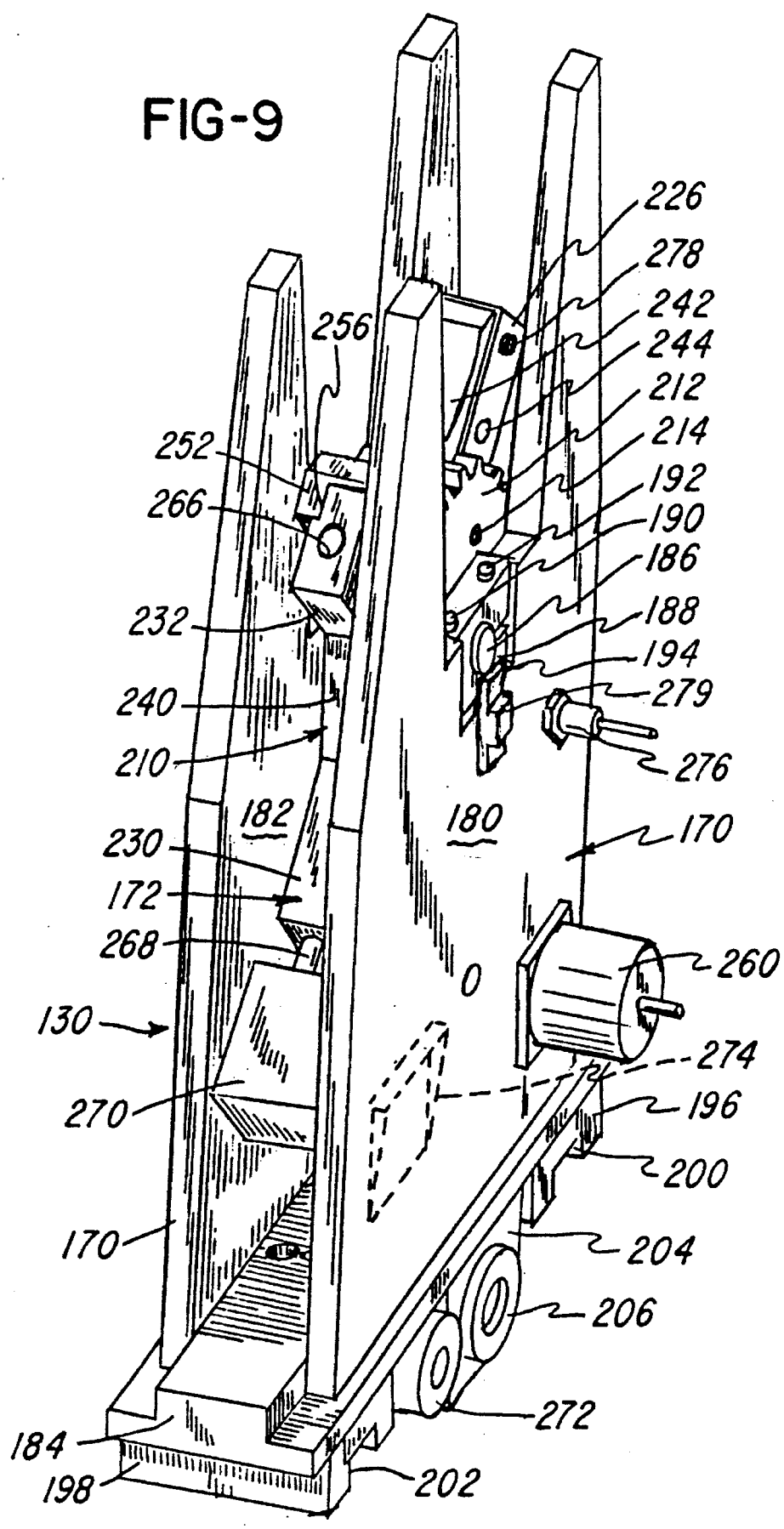
FIG. 9 is a perspective view of a cylinder support member of the engraver of FIG. 7.

As best seen in FIG. 9, each cylinder support 130 includes a support housing 170 comprising two generally parallel support walls or plates 180, 182 mounted on a support block 184 by bolts (not shown). A support structure 172 is mounted for rotation between the plates 180, 182 on a shaft 186 which is held in position on the plates 180, 182 by bearing blocks 188 (only one shown). Each of the bearing blocks 188 is tightened over the shaft 186 by a pair of bolts 190, 192 (only one pair shown) which also secure the bearing blocks 188 in a well 194 of the housing plates 180, 182.

While FIG. 9 illustrates the support structure without sidewalls extending between the plates 180, 182, it should be understood that side fittings (not shown) may be bolted to the sides of the housing plates 180, 182. The side fittings may be in the form of continuous metal strips or of flat plates arranged on the sides of the housing plates 180, 182.

Figure 10:
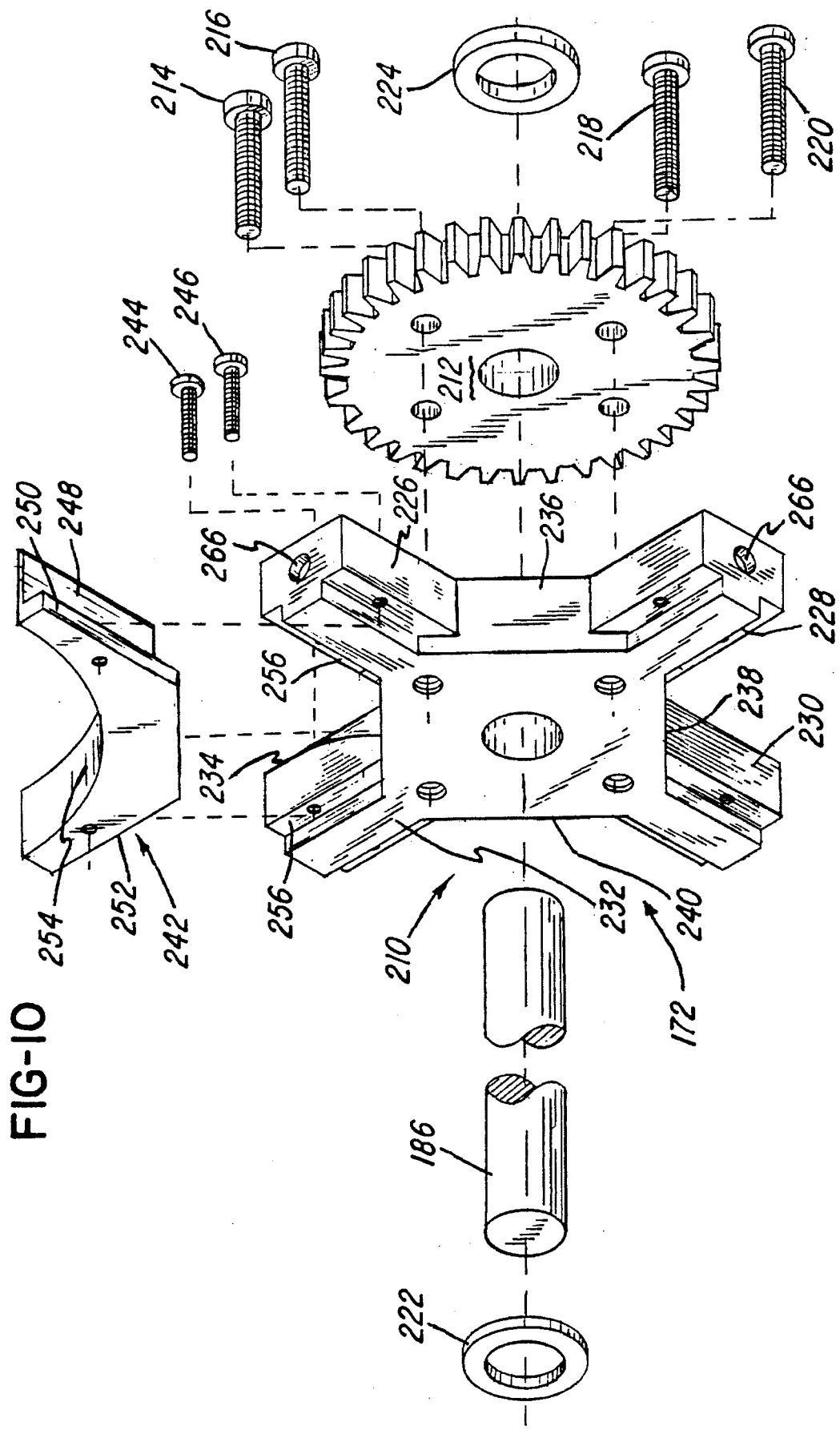
FIG. 10 is an exploded view of a support structure for use in the cylinder support member of FIG. 9.

Referring to FIG. 10, the support structure 172 includes a conveyor means or wheel 210 having a driven gear 212 secured thereto by bolts 214, 216, 218, 220. In addition, spacers 222, 224 are provided for positioning the wheel 210 and the driven gear 212 between the bearing blocks 188 (FIG. 7). The wheel 210 and driven gear 212 are supported on the shaft 186, and are mounted for free rotation relative to the shaft 186.

The wheel 210 further includes four arms 226, 228, 230, 232 which define four cylinder receiving areas 234, 236, 238, 240 into which cylinder-receiving inserts or saddles 242 (see also FIG. 11) may be secured as by bolts 244, 246. While four cylinder-receiving areas 234, 236, 238, 240 are illustrated in FIG. 10, it is contemplated that more or fewer cylinder-receiving areas and associated saddles may be used depending on the sizes of cylinders 114 to be accommodated as well as any size limitations on the wheel 210. Preferably, the saddles 242 are constructed to receive the end shafts 162, 164 of the cylinder 114 to position the end shafts 162, 164 precisely relative to the chucks 154.

Figure 11:
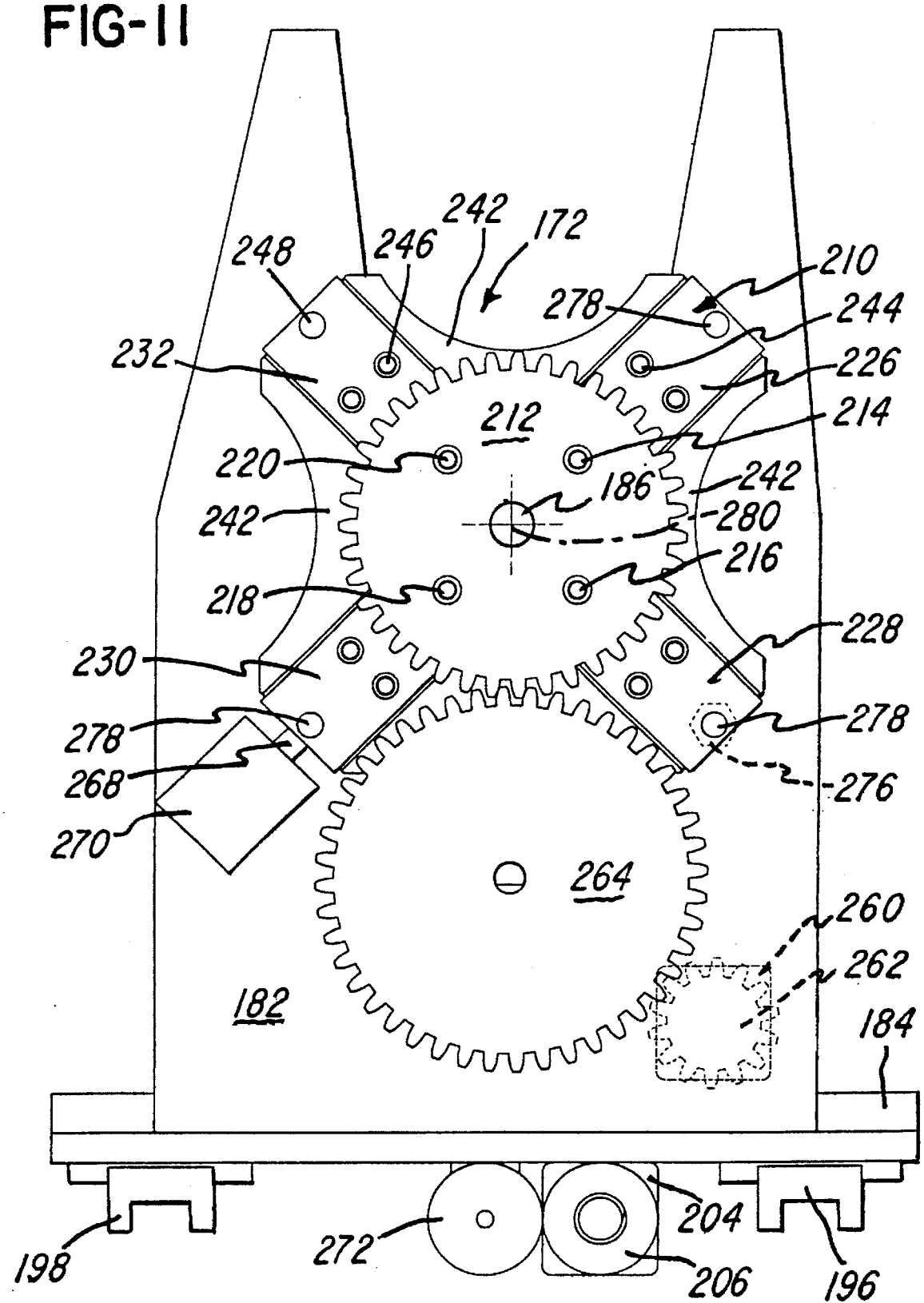
FIG. 11 is a front elevational view of the cylinder support member of FIG. 9 with the front housing plate removed.

Referring to FIGS. 10 and 11, the saddles 242 are integral, approximately trapezoidal inserts, preferably formed of bronze or a hard rubber. Each saddle 242 includes a seat portion 248 and a pair of flanges 250, 252 for engaging slots 256 defined on the arms 226, 228, 230, 232 to facilitate positioning the saddles 242 on the wheel 210. The seat portion 248 defines an arcuate or concave shaft receiving surface 254 for supporting a shaft 162, 164 of the cylinder 114. Preferably, a saddle 242 is mounted in each of the cylinder-receiving areas 234, 236, 238, 240 wherein each of the saddles 242 has a different radius of curvature for accurately accommodating different cylinder shaft dimensions in a predetermined vertical position.

The saddle 242 may be detached and replaced by other saddles (not shown) of different configuration to accommodate cylinders 114 having different dimensions. For example, the saddle 242 may be replaced by detaching the bolts 244, 246 from the arms 226, 232 and removing the saddle 242. Another saddle (not shown) may be positioned against the arms 226, 232 and secured by replacing the bolts 244, 246.

As shown schematically in phantom in FIG. 11, the support wall 182 also supports a wheel driver or drive means 260, such as an electric stepper motor, for rotating the wheel 210 to position one of the saddles 242 at the top or apex of the wheel 210 for receiving one of the end shafts 162, 164 of the cylinder 114. The driver 260 includes a rotatably-driven drive shaft (not shown) coupled to a drive gear 262. The drive gear 262 meshes with a pinion gear 264 which, in turn, meshes with the driven gear 212 whereby the driver 260 selectively rotates the wheel 210.

The cylinder support 130 has locking means for maintaining the wheel 210 in a selected orientation. The locking means includes radial sockets 266 (FIGS. 9 and 10) in the ends of the arms 226, 228, 230, 232 and a wheel-engaging means or locking pin 268. A linear actuator 270, such as a pneumatic, hydraulic, or other linear actuator, is mounted to the support wall 182 for driving the locking pin 268 into and out of engagement with the sockets 266. When it is desired to select a different saddle 242, the locking pin 268 may be withdrawn from one of the sockets 266 by means of the linear actuator 270, such that the wheel 210 is free to be rotated by the driver 260. Upon reaching a desired rotational position, the locking pin 268 is inserted into one of the sockets 266 to fix the new orientation of the wheel 210.

Referring to FIGS. 7 and 9, the cylinder support members 130 further include a pair of shoes 196, 198 mounted to the carriage block 184 and defining guide slots 200, 202 for slidably mounting the cylinder support members 130 on tracks 120. In addition, a support drive motor 204 is mounted to the support block 184 and is operably coupled to a rotatable drive nut 206 through a gear train (not shown). It should be noted that in the preferred embodiment a pair of leadscrews 150 are non-rotatably mounted to the base 112 and each of the rotatable nuts 206 of the cylinder support members 130 are rotatably engaged with a respective leadscrew 150 such that actuation of the support drive motors 204 will result in positioning of the support members 130 to desired locations along the respective leadscrews 150. Thus, the support members 130 may be positioned to desired locations relative to each other depending on the configuration of the cylinder 114 being positioned within the engraver 110. For example, the spacing between the support members 130 may be increased or decreased to accommodate different lengths of cylinders positioned within the engraver 110.

A strain cell 279, forming a sensing means, is rigidly mounted to the support housing 170. When a cylinder 114 is lowered onto the cylinder support 130, a small deformation of the support housing 170 occurs. This deformation is reflected in the strain cell 279, which causes the electrical resistance of the strain cell 279 to change. By sensing the change in resistance of the strain cell 279, the presence or absence of a cylinder 114 can be detected. Alternately, other devices such as an optical sensor could be used to detect the presence or absence of a cylinder 114. The strain call 279 is connected to the controller 117 and when a cylinder 114 is present, no linear or rotary motions of the cylinder support components are permitted.

It should be noted that although the preferred embodiment of the present invention comprises providing a leadscrew 150 for each of the cylinder supports 130, an alternative construction of the invention may include a single, long leadscrew engaged by the drive nuts 206 of both the cylinder supports 130.

Referring back to FIG. 7, the engraver 110 comprises a controller (shown schematically at 117) which controls the operation of the engraver 110 and which also controls all the drive motors, such as the drive motors 121, 128, 146, 148, 204 and 260, and the actuator 270. The controller 117 preferably includes a processor (not shown) which can be programmed with information including the dimensions of the cylinder 114, such as length and diameter of the surface 113 as well as diameters and lengths of the end shafts 162, 164. This information is then available for use by the controller 117 to automatically position the headstock 116, tailstock 118, cylinder supports 130 and engraving head 122 for an engraving operation.

The engraver 110 also comprises sensing means coupled to the controller 117, including the first sensing means or sensors 142 which are capable of sensing, for example, the surface 113 and the ends 114a and 114b (FIG. 8) of the cylinder 114; and second sensing means or sensors 144 associated with the headstock 116 and tailstock 118 for detecting the approximate location of the carriage 124 relative to the headstock 116 and tailstock 118. As in the embodiment of FIG. 1, the first and second sensors 142 and 144 may be used to facilitate preventing the carriage 124 from engaging either the headstock 116 or the tailstock 118.

As shown in FIG. 9, third sensing means or third sensors (not shown) coupled to the controller 117 are associated with the cylinder supports 130 for detecting the approximate locations of the cylinder supports 130 along the base 112. In the embodiment shown, the third sensor is an encoder 272 associated with the drive nut 206 for accurately monitoring the rotation of the drive nut 206 relative to the at least one leadscrew 150. Thus, by monitoring the rotation of the encoders 272, the controller 117 may monitor the positions of the cylinder supports 130 along the base 112 to accurately position the supports at desired locations.

In an alternate embodiment, the third sensor is an optical sensor 274 (shown in phantom) operating in a manner similar to the sensors 144 associated with the headstock 116 and tailstock 118. Yet again, the third sensor (not shown) may be dispensed with if the drive motor 204 is a stepper motor.

Fourth sensing means or sensors 276 (FIG. 11) coupled to the controller 117 are associated with each cylinder support 130 for detecting the orientation of the wheel 172. In the embodiment shown, the fourth sensor 276 is an induction sensor, preferably a magnetic proximity switch, which senses changes in electromagnetic induction in its vicinity. The fourth sensor 276 is mounted on the support wall 180 and faces the wheel 210 for sensing a lug 278 (only one shown) on each of the arms 226, 228, 230, 232. As shown in FIG. 11, the lugs 278 are equidistant from a central axis 280 of the shaft 186, and each of the lugs 278 are at approximately the same radius from the central axis 280 as the fourth sensor 276. Consequently, the lugs 278 pass near the fourth sensor in sequence as the wheel 210 rotates.

The lugs 278 are constructed so that the magnetic flux near the fourth sensor 276 changes each time one of the lugs 278 passes near the fourth sensor 278. The fourth sensor 278 senses the change in magnetic flux and signals the controller 117 each time one of the lugs 278 passes near it. By tracking the number of such signals from the fourth sensor 276, the controller 117 monitors the rotational orientation of the wheel 210.

In an alternative embodiment, a single lug (not shown) may be positioned on one of the arms 226, 228, 230 or 232 radially inwardly or outwardly of the lug 278. This lug (not shown) would be positioned to align with a second inductive sensor (not shown) when the wheel 210 is in a "home" orientation in which a selected one of the saddles 242 is vertically oriented. Consequently, the second inductive sensor (not shown) would signal the controller 117 only when the wheel 210 passes through its home orientation to thereby enable the controller 117 to monitor the number of revolutions which the wheel 210 makes.

The signals from the fourth sensor 276 enables the controller 117 to select one of the saddles 242 to receive the cylinder 114. Preferably, the controller 117 is programmed with the order of the saddles 242 on the wheel 210. In addition, the controller 117 is programmed with the dimensions of cylinders 114 which each saddle 242 is constructed to receive. By tracking the signals from the fourth sensor 276, the controller 117 can determine the orientation of the wheel 210. From this information, the controller 117 can energize the driver 260 to rotate the wheel 210 into an orientation in which an appropriately-constructed saddle 242 is positioned to receive a cylinder 114 of predetermined dimensions. Further, the programming of the controller 117 may be updated when one of the saddles 242 is removed from the wheel 117 and a saddle (not shown) of different construction is substituted such that saddles having different configurations may be readily incorporated into the system.

A method for loading and unloading the cylinder 114 on the engraver 110 will now be described with reference to FIGS. 7, 8 and 11.

Referring first to FIG. 7, when it is desired to load a cylinder 114 on engraver 110, controller 117 is programmed with the predetermined dimensions of the cylinder, including, for example, the length and diameter of the cylinder surface 113 between the ends 114a, 114b of the cylinder 114 as well as the diameter of the end shafts 162, 164. The controller 117 then energizes the first and second driver motors 146 and 148 to cause the headstock 116 and tailstock 118, respectively, to move to open positions in which the headstock 116 and tailstock 118 are separated by sufficient distance to provide clearance for the full length of the cylinder 114. The controller 117 also energizes the drive motors 204 of cylinder supports 130 to position the cylinder supports 130 at opposite ends of the engraving station 115 at an appropriate distance to receive the end shafts 162, 164 of the cylinder 114.

Next, referring to FIG. 11, the controller 117 selects one of the saddles 242 to receive the cylinder 114. The controller 117 first signals the actuator 270 to retract the locking pin 268 from engagement with one of the sockets 266. Next, the controller 117 uses the signals from the fourth sensor 276 to energize the driver 260 to rotate the wheel 210 until one of the saddles 242 is vertically oriented at the apex of the wheel 210 in a position to receive the cylinder 114. When the appropriately-constructed one of the saddles 242 is positioned to receive the cylinder 114, the controller 117 energizes the linear actuator 270 to move the locking pin 268 into the adjacent one of the sockets 266 to fix the orientation of the wheel 210.

Returning to FIG. 7, after the headstock 116 and tailstock 118 have been actuated to the open position and the cylinder support members 130 are in the support position, the cylinder 114 is lowered onto the cylinder support members 130 by an overhead crane or other means. The cylinder supports 130 position the cylinder 114 on a seated axis 168 with each of its end shafts 162, 164 resting on one of the saddles 242.

Turning to FIGS. 7 and 8, once the cylinder 114 is supported by the cylinder supports 130, the controller 117 (FIG. 7) energizes the first and second drive motors 146, 148 (FIG. 7) to drive the headstock 116 and the tailstock 118 towards the end shafts 162, 164, respectively, until the chucks 154 surround the end shafts 162, 164. Subsequently, the chucks are actuated to grip the end shafts 162, 164 causing the cylinder 114 to be lifted from the respective support members 130 a distance of approximately 0.005 inch (0.0125 cm), from its seated axis 168 (FIG. 7) to an engraving axis 166 (FIG. 8). This lifting provides a clearance between the end shafts 162, 164 and the saddles 242 (FIG. 11) of the cylinder supports 130, thereby permitting the cylinder 114 to rotate without frictional interference from the saddles 242 (FIG. 11).

After the cylinder 114 is engaged by the headstock 116 and tailstock 118 at the engraving station 115, the controller 117 (FIG. 7) energizes the third drive motor 121 (FIG. 7) to move the carriage 124 and engraving head 122, respectively, into operative relationship with the surface 113 of the cylinder 114. It is to be noted that the controller 117 (FIG. 7) may use sensors 142 and 144 to detect the relative position of the cylinder 114 with respect to the engraving head 122 and to position the engraving head 122 relative to the approximate center of the cylinder surface 113 despite variations in cylinder dimensions. The sensors 142 and 144 are also capable of sensing the ends 114a and 114b of the cylinder 114 in order to facilitate preventing the engraving head 122 and carriage 124 from contacting the cylinder supports 130.

After the cylinder 114 has been engraved, controller 117 (FIG. 7) energizes third drive motor 121 to retract the engraving head 122. Controller 117 then signals the chucks 154 to release the end shafts 162, 164 and energizes the first drive motor 146 and the second drive motors 148 to retract the headstock 116 and tailstock 118, respectively, to positions shown in FIG. 7. The release of the chucks 154 from the end shafts 162, 164 causes the cylinder 114 to again rest on the cylinder supports 130. The cylinder 114 may then be removed from the engraver 110 by the overhead crane or other means used to load the cylinder 114.

Various changes or modification in the invention described may occur to those skilled in the art without departing from the true spirit or scope of the invention. For example, although the invention has been shown and described as being pertinent to the gravure engraving environment, it should be appreciated that it could be used in other type of engraving, such as laser engraving of flexo rollers or other processes such as polishing of cylinders 114. Furthermore, the present invention is not limited to engravers 110 using collet chucks 154 to engage shafted cylinders, and contemplates the use of other cylinder engaging means including without limitation chucks using jaws, rollers, set screws or other forms of gripping members.

The second embodiment, FIGS. 7–10, has been described in terms of cylinder support members 130 adapted to receive end shafts 162, 164 of a shafted cylinder 114. While the second embodiment is particularly advantageous when used with shafted cylinders, it is contemplated to use the cylinder support members 130 of the second embodiment in connection with shaftless cylinders. If used with shaftless cylinders, the radii of the concave surfaces 242, 244, 246 of the saddles 212, 214, 216 would correspond with the radius of the surface 113 of the cylinder 114 rather than the radii of the end shafts 162, 164.

In addition, while the wheel 210 has been shown as having arms 226, 228, 230, 232 defining cylinder-receiving areas 234, 236, 238, 240, the support structure 172 is not limited to structure including a wheel. According to one alternative embodiment, a wheel may be provided having arcuate cut-outs for receiving the saddles, rather than the angular cut-out areas provided by the present invention.

The above description of the invention is intended to be illustrative only and not limiting, and it is not intended that the invention be restricted thereto, but that it be limited only by the true spirit and scope of the appended claims.

What is claimed is:

1. A cylinder support for use in an engraver comprising:
    a support member; and
    an adjustable support associated with said support member for receiving one of a plurality of cylinders having different dimensions such that an axis of rotation of each of said plurality of cylinders is situated in the same approximate predetermined mounting position in said engraver.

2. The cylinder support as recited in claim 1 wherein said adjustable support comprises:
    a plurality of cylinder-receiving areas.

3. The cylinder support as recited in claim 2 including a driver for driving the adjustable support to select one of said plurality of cylinder-receiving areas.

4. The cylinder support as recited in claim 1 wherein said adjustable support further comprises:
    an insert support for receiving at least one insert; and
    at least one insert defining a cylinder-receiving surface conforming to a portion of said cylinder.

5. The cylinder support as recited in claim 4 wherein said portion is an end shaft of said cylinder.

6. The cylinder support as recited in claim 1 wherein said adjustable support comprises:
    an insert support for receiving a plurality of inserts;
    a plurality of inserts each defining a cylinder-receiving surface conforming to a portion of the cylinder; and
    a driver associated with said support member for driving one of said plurality of inserts into a cylinder-receiving position.

7. The cylinder support as recited in claim 6 wherein said plurality of inserts are located about a center axis of said adjustable support; and
    said driver for indexing one of said plurality of inserts into the cylinder-receiving position.

8. The cylinder support as recited in claim 1 wherein said cylinder support further comprises a support drive for driving said cylinder support relative to said engraver.

9. The cylinder support as recited in claim 8 wherein said support drive comprises a rotatable nut for rotatably mounting on a leadscrew associated with the engraver.

10. A method of registering one of a plurality of cylinders into a predetermined position in an engraver, said method comprising the steps of:
    adjusting an adjustable support for mounting each of said plurality of cylinders such that an axis of rotation of each of said plurality of cylinders is situated in about the same predetermined position such that a preselected receiver corresponding to a portion of said one cylinder is situated on said engraver; and
    locating said one cylinder on said preselected receiver in order to cause the one cylinder to be registered into said predetermined position.

11. The method as recited in claim 10 wherein said adjustable support comprises a plurality of receivers including said preselected receiver, said method further comprising the step of:
    indexing said predetermined receiver into a receiving position.

12. The method as recited in claim 10 wherein said adjustable support comprises a plurality of receivers, said method further comprising the steps of:
    removing one of said receivers from said adjustable support; and
    inserting said predetermined receiver on said adjustable support.

13. The method as recited in claim 10 wherein said adjustable support comprises a first support member and a second support member, said method further comprising the step of:

positioning said first and second support members in a predetermined relationship to facilitate receiving said cylinder therebetween.

14. The method as recited in claim 13 wherein each of said first and second support members comprises a plurality of receivers, said method comprising the step of:
indexing at least one of said plurality of receivers into a receiving position.

15. The method as recited in claim 10 wherein said adjusting step further comprises the step of:
locating said preselected receiver on said adjustable support.

16. The method as recited in claim 10 wherein said method further comprises the step of:
rotatably mounting said cylinder in said engraver.

17. The method as recited in claim 10 wherein said cylinder comprises a first end and a second end, and said engraver comprises a headstock and tailstock, said method comprising the step of:
moving said headstock and tailstock in operative relationship with said first and second ends, respectively, in order to rotatably mount said cylinder therebetween.

18. A method of positioning at least one of a plurality of cylinders in an engraver comprising a mounting axis, said method comprising the steps of:
aligning cylinder-receiving areas of at least two cylinder supports, said at least two cylinder supports being capable of aligning an axis of each of said plurality of cylinders substantially in the same position on the engraver; and
engaging the cylinder with the cylinder-receiving areas to align the cylinder with the mounting axis.

19. The method as recited in claim 18 wherein said at least two cylinder supports include support members and wherein the step of aligning the cylinder-receiving area includes moving the cylinder-receiving areas relative to the support members.

20. The method as recited in claim 18 wherein the step of aligning the cylinder-receiving areas includes moving at least one of the at least two cylinder supports relative to the engraver.

21. The method as recited in claim 18 wherein the step of aligning the cylinder-receiving areas includes energizing a motor.

22. The method as recited in claim 18 wherein the step of engaging the cylinder with the cylinder-receiving area includes engaging end shafts of the cylinder with the cylinder-receiving areas.

23. The method as recited in claim 22 wherein the step of engaging the cylinder with the cylinder-receiving area includes locating a portion of the cylinder on a cylinder-receiving surface at the cylinder-receiving area.

24. The method as recited in claim 18 including the additional step of engaging the cylinder with a headstock and tailstock.

25. The method as recited in claim 24 wherein the step of engaging the cylinder with a headstock and tailstock includes moving at least one of the headstock and tailstock relative to the cylinder.

26. The method as recited in claim 24 including the additional step of rotating the cylinder.

27. A method of positioning a cylinder in an engraver, said method comprising the steps of:
aligning cylinder-receiving areas of at least two cylinder supports relative to a mounting axis;
engaging the cylinder with the cylinder-receiving areas to align the cylinder relative to the mounting axis;
engaging the cylinder with a headstock and tailstock along the mounting axis; and
moving an engraving head relative to the cylinder between the cylinder supports.

28. The method as recited in claim 24 including the additional step of engraving a surface of the cylinder between the cylinder supports.

29. The method as recited in claim 18 including the additional step of engaging the cylinder with a headstock and tailstock along the mounting axis, whereby the cylinder is disengaged from the cylinder-receiving areas.

30. A cylinder support for facilitating registration of one of a plurality of cylinders in a predetermined mounting position in an engraver, said plurality of cylinders each comprising a different dimension, said cylinder support comprising:
first cylinder support means for receiving a portion of said one cylinder; said first cylinder support means positioning a rotational axis of each of said plurality of cylinders in said predetermined mounting position, and
second cylinder support means for positioning said first cylinder support means relative to the predetermined mounting position.

31. The cylinder support as recited in claim 30 wherein said first cylinder support means defines at least one cylinder-receiving area for receiving the portion of the cylinder.

32. The cylinder support as recited in claim 31 wherein said at least one cylinder-receiving area is arranged radially with respect to a center axis.

33. The cylinder support as recited in claim 30 wherein said first cylinder supporting means includes at least one detachable saddle means for receiving the cylinder.

34. The cylinder support as recited in claim 30 wherein said first cylinder support means includes a plurality of detachable saddle means for receiving a plurality of cylinders having different dimensions.

35. The cylinder support as recited in claim 30 wherein said second cylinder supporting means includes drive means for driving said first cylinder supporting means relative to said second cylinder supporting means.

36. The cylinder support as recited in claim 35 wherein said drive means is a drive motor.

37. The cylinder support as recited in claim 30 including sensing means associated with said adjustable support for monitoring movement of said first cylinder support means relative to said second cylinder support means.

38. The cylinder support as recited in claim 30 including locking means for restraining said first cylinder support means from movement relative to said second cylinder support means.

39. An engraver for engraving a cylinder comprising:
a headstock for engagement with the cylinder near a first end;
a tailstock for engagement with the cylinder near a second end; and
at least two cylinder supports, each cylinder support including a support member and an adjustable support associated with said support member;
said adjustable support receiving a plurality of cylinders having different dimensions in order to facilitate registering an axis of each of said plurality of cylinders in substantially the same position when each of said plurality of cylinders are mounted between said headstock and tailstock.

40. The engraver as recited in claim 39 wherein said adjustable support comprises:

a plurality of cylinder-receiving areas.

41. The engraver as recited in claim 40 including a driver for selecting one of said plurality of cylinder-receiving areas to receive said cylinder.

42. The engraver as recited in claim 41 including a controller in electrical communication with the driver for energizing the driver to select said one of said plurality of cylinder-receiving areas, said controller being programmed with at least one dimension of the cylinder.

43. The engraver as recited in claim 40 including a controller, a driver and a sensor in electrical communication, said sensor monitoring a position of said cylinder-receiving area for cooperation with said controller to energize said driver to select one of said plurality of cylinder-receiving areas to receive said cylinder.

44. The engraver as recited in claim 39 wherein said adjustable support further comprises:

an insert support for receiving at least one insert;

said at least one insert comprising a cylinder-receiving surface conforming to a portion of said cylinder.

45. The engraver as recited in claim 39 including a support drive for driving at least one of said cylinder supports relative to said headstock and tailstock.

46. The engraver as recited in claim 45 wherein said support drive comprises a rotatable nut for rotatably mounting on a leadscrew associated with the engraver.

47. The engraver as recited in claim 45 including a controller in electrical communication with said support drive for energizing said support drive for driving said at least one of said cylinder supports relative to said headstock and tailstock, said controller being programmed with at least one dimension of the cylinder.

48. The engraver as recited in claim 47 wherein said controller is in electrical communication with said headstock and tailstock.

49. The engraver as recited in claim 39 including a controller, a support drive and a sensor in electrical communication, said sensor monitoring a position of one of said at least two cylinder supports for cooperation with said controller to energize said support drive to position said at least one of said cylinder supports relative to said headstock and tailstock.

50. The engraver as recited in claim 47 including a sensor connected to said controller for sensing the presence or absence of a cylinder.

51. The engraver as recited in claim 50 wherein said sensor is a strain cell mounted to at least one of said cylinder supports.

52. The engraver as recited in claim 43 wherein said engraver comprises a bed having an engraving head slidably positioned thereon;

said position being a lateral position between said headstock and said tailstock.

53. The cylinder support as recited in claim 43 wherein said engraver comprises a bed having an engraving head slidably positioned thereon;

said position is a horizontal mounting position relative to said bed.

* * * * *

UNITED STATES PATENT AND TRADEMARK OFFICE
CERTIFICATE OF CORRECTION

PATENT NO. : 5,583,647  
DATED : December 10, 1996  
INVENTOR(S) : Izor et al.

Page 1 of 4

It is certified that error appears in the above-indentified patent and that said Letters Patent is hereby corrected as shown below:

On the title page, in section [56], in the second column, line 15, please delete "telemag" and insert --Telemag-- therefor.

On page 2, in section [56], in the second column, line 19, please delete "better accuracy with non-precision ball screws" and insert --Better Accuracy with Non-precision Ball Screws-- therefor.

On page 2, in section [56], in the second column, line 21, please delete "Correcting station Type 86" and insert --Correcting Station Type 86-- therefor.

On page 2, in section [56], in the second column, line 23, please delete "Walter Quick-Clamp Copper and Chrome plating" and insert --Walter, Quick-Clamp Copper and Chrome Plating-- therefor.

In column 3, line 3, please delete "drawing" and insert --drawings-- therefor.

In column 6, line 67, please delete "correction" and insert --corrections-- therefor.

In column 8, lines 24-25, please delete "thousandths" and insert --thousandths of an inch-- therefor.

In column 13, line 33, please delete "type of" and insert --types of-- therefor.

UNITED STATES PATENT AND TRADEMARK OFFICE
CERTIFICATE OF CORRECTION

PATENT NO. : 5,583,647
DATED : December 10, 1996
INVENTOR(S) : Izor et al.

It is certified that error appears in the above-indentified patent and that said Letters Patent is hereby corrected as shown below:

In claim 10, column 14, line 44, please delete "one cylinder" and insert --one of said plurality of cylinders-- therefor.

In claim 10, column 14, line 46, please delete "one cylinder" and insert --one of said plurality of cylinders-- therefor.

In claim 10, column 14, line 47, please delete "the one cylinder" and insert --said one of said plurality of cylinders-- therefor.

In claim 11, column 14, line 53, please delete "predetermined" and insert --preselected-- therefor.

In claim 12, column 14, line 60, please delete "predetermined" and insert --preselected-- therefor.

In claim 18, column 15, line 29, please delete "on the" and insert --on said-- therefor.

In claim 18, column 15, line 31, please delete "engaging the cylinder with the" and insert --engaging said at least one of said plurality of cylinders with said-- therefor.

In claim 18, column 15, line 32, please delete "the cylinder with the" and insert --said at least one of said plurality of cylinders with said-- therefor.

In claim 19, column 15, line 35, please delete "area" and insert --areas-- therefor.

UNITED STATES PATENT AND TRADEMARK OFFICE
CERTIFICATE OF CORRECTION

PATENT NO. : 5,583,647

DATED : December 10, 1996

INVENTOR(S) : Izor et al.

It is certified that error appears in the above-indentified patent and that said Letters Patent is hereby corrected as shown below:

In claim 22, column 15, line 46, please delete "area" and insert --areas-- therefor.

In claim 30, column 16, line 17, please delete "portion of said" and insert --portion of-- therefor.

In claim 30, column 16, line 18, please delete "one cylinder" and insert --one of said plurality of cylinders-- therefor.

In claim 31, column 16, line 26, please delete "the portion" and insert --a portion-- therefor.

In claim 33, column 16, line 31, please delete "supporting" and insert --support-- therefor.

In claim 35, column 16, line 38, please delete "supporting" and insert --support-- therefor.

In claim 35, column 16, line 39, please delete "supporting" and insert --support-- therefor.

In claim 35, column 16, line 40, please delete "supporting" and insert --support-- therefor.

In claim 53, column 18, line 27, please delete "is" and insert --being-- therefor.

UNITED STATES PATENT AND TRADEMARK OFFICE
CERTIFICATE OF CORRECTION

PATENT NO. : 5,583,647
DATED : December 10, 1996
INVENTOR(S) : Izor et al.

It is certified that error appears in the above-indentified patent and that said Letters Patent is hereby corrected as shown below:

Please insert claim 54 as follows:

--The engraver as recited in claim 44 wherein said portion is an end shaft of said cylinder.--

Signed and Sealed this

Eleventh Day of November, 1997

Attest:

BRUCE LEHMAN

Attesting Officer

Commissioner of Patents and Trademarks